United States Patent [19]

Wotawa

[11] Patent Number: 4,619,068
[45] Date of Patent: Oct. 28, 1986

[54] FISHING LURE

[76] Inventor: Fred W. Wotawa, 4646 Heege Rd., Affton, Mo. 63123

[21] Appl. No.: 637,075

[22] Filed: Aug. 2, 1984

[51] Int. Cl.[4] ............................................. A01K 85/00
[52] U.S. Cl. .................................. 43/42.11; 43/42.13; 43/42.31
[58] Field of Search .................. 43/42.11, 42.13, 42.14, 43/42.17, 42.18, 42.19, 42.2, 42.26, 42.28, 42.31, 42.52, 42.16

[56] References Cited

U.S. PATENT DOCUMENTS

| | | | |
|---|---|---|---|
| 1,585,443 | 5/1926 | Streich | 43/42.18 |
| 1,787,726 | 1/1931 | Heddon | 43/42.13 |
| 2,805,512 | 9/1957 | Bunce | 43/42.18 |
| 3,143,824 | 8/1964 | Thomas | 43/42 |
| 3,546,804 | 12/1970 | Woolums | 43/42 |
| 3,808,726 | 5/1974 | Flanagan | 43/42.13 |
| 4,003,154 | 1/1977 | Carver | 43/42.13 |
| 4,209,932 | 7/1980 | Pate | 43/42 |
| 4,432,157 | 2/1984 | Gowing | 43/42.31 |

Primary Examiner—Nicholas P. Godici
Assistant Examiner—Christopher L. McKee
Attorney, Agent, or Firm—Senniger, Powers, Leavitt and Roedel

[57] ABSTRACT

A fishing lure comprising first and second diverging arms, means adjacent the juncture of the arms for attaching the lure to a fishing line, a hook connected to the first arm, a vane connected to the second arm to permit oscillating movement of the vane relative to the second arm, a spinner and means swivelly connecting the spinner to the vane.

8 Claims, 3 Drawing Figures

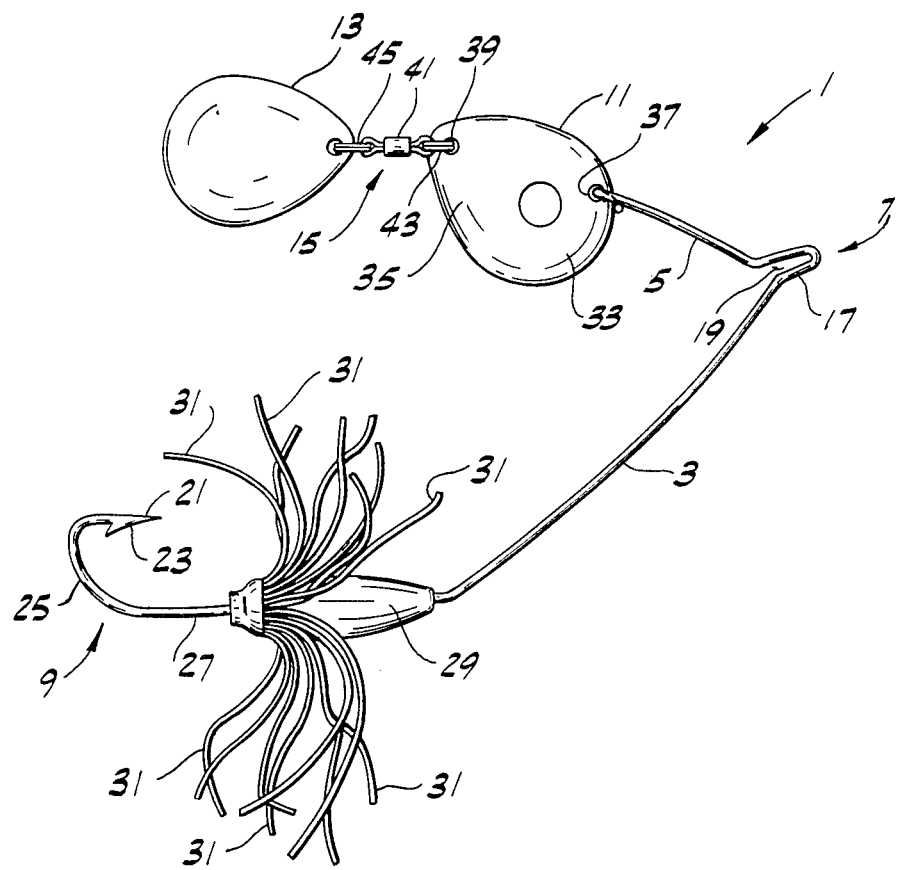
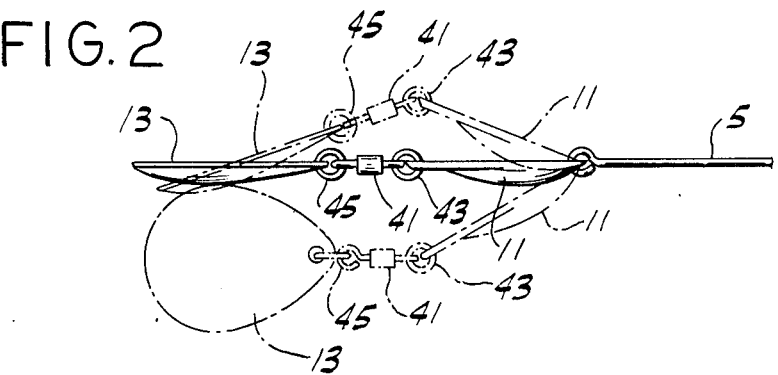
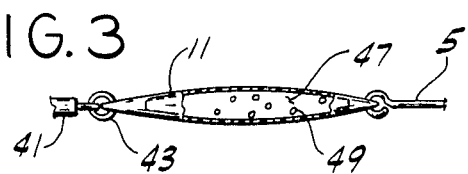

4,619,068

FISHING LURE

BACKGROUND OF THE INVENTION

This invention relates generally to fishing lures of the spinner bait type having diverging arms, a body and hook portion and one or more spinner blades for attracting fish, and more particularly to such a fishing lure having a vane capable of oscillating relative to a portion of the lure.

It is a well-known fact that fish are attracted by vibrations and other movements and that the more closely the movement of an artificial bait, such as a lure, imitates the natural movement of real bait, the more likely a fish will strike at the lure.

Reference may be made to U.S. Pat. Nos. 4,209,932, 3,546,804 and 3,143,024 each of which discloses a fishing lure of the same general type as that of the lure of this invention.

SUMMARY OF THE INVENTION

Among the several objects of this invention may be noted the provision of a fishing lure which has an oscillating vane for imitating the movement of a small fish; and the provision of such a fishing lure which is of simple and economical construction.

In general, a fishing lure of this invention comprises first and second diverging arms, means adjacent the juncture of the arms for attaching the lure to a fishing line, a hook connected to the first arm, a vane connected to the second arm to permit oscillating movement of the vane relative to the second arm, a spinner and means swivelly connecting the spinner to the vane.

Other objects and features will be in part apparent and in part pointed out hereinafter.

BRIEF DESCRIPTION OF THE DRAWINGS

FIG. 1 is a side elevation of a fishing lure of this invention;

FIG. 2 is a top plan of FIG. 1 with the lower portion of the lure removed for clarity and movement of the top portion of the lure shown in phantom; and FIG. 3 is an enlarged top view illustrating a second embodiment of the vane of the invention with parts broken away to show details.

Corresponding reference characters indicate corresponding parts throughout the several views of the drawings.

DESCRIPTION OF THE PREFERRED EMBODIMENT

Referring now to the drawings, a fishing lure 1 of this invention is shown as comprising first and second diverging arms, 3 and 5 respectively, and means 7 adjacent the juncture of the arms for attaching the lure to a fishing line (not shown). A hook 9 is connected to the first arm 3, lower arm as viewed in FIG. 1, and a vane 11 is connected to the second arm 5, upper arm as viewed in FIG. 1. The lure further comprises a spinner 13 and means 15 for swivelly connecting the spinner to the vane.

More particularly, the arms 3, 5 are formed from a single strand of relatively resilient wire and are disposed in a generally coplanar relationship. The arms are joined by attaching means 7 comprising an eye 17 with a rearward (the left end as viewed in FIG. 1) peripheral opening 19. A fishing line or the like is secured to the eye 17 in any conventional manner. It will be understood by those familiar with the art that eye 17 could also be closed.

The hook 9 of the lure has a point 21, barb 23, bend 25 and a shank 27. A weighted body 29 is molded around the shank and made from lead or the like. A plurality of long strands 31 are suitably secured to one end of the body (the left end as viewed in FIG. 1) and are used to conceal the hook and barb as will be described later to provide more attraction for fish during the use of the lure.

The vane 11 of the lure is connected to the free end of the second arm 5 and, as shown in FIG. 2, is generally pearshaped with a relatively broad front portion 33 and a narrower rear portion 35. However, it will be understood that the vane can be of any shape, e.g., triangular, or rectangular, etc. The vane is made of any suitable material, such as a synthetic resin material, with one side being generally flat and the other being somewhat rounded as shown in FIG. 2. The front portion of the vane has a hole 37 therein for attaching the vane to the free end of the second arm. This attachment is accomplished by simply passing the free end of the second arm through the hole 37 and bending it back, thereby forming a hook. This type of a connection permits the vane 11 to oscillate, i.e., move from side to side, relative to the second arm. The vane has a second hole 39 in the rear portion thereof for attachment of a swivel or clevis 41 thereto. A swivel, as shown in FIG. 1, is attached to the vane by means of a first split ring 43 as shown in the drawings. A second split ring 45 is used to attach the spinner 13 to the swivel 41. It will be understood that the vane can be of any color with spots or the like painted thereon in order to attract game fish.

In an alternative embodiment, FIG. 3 shows a torpedo-shaped vane i.e., having convex sides having an inner cavity 47 with a plurality of pellets or BB's 49 therein. The number and size of the pellets are such that they can freely move within the cavity of the vane.

As the lure is being trolled or retrieved (from left to right as shown), it will be generally disposed as viewed in FIG. 1 due to the weight of the body 29. The ends of the strands 31 will conceal the hook 9 due to the movement of the lure through the water as will be understood by those familiar in the art. The vane will swing from side to side as shown in FIG. 2 with the spinner moving freely therebehind. The resulting oscillating movement of the vane and the spinner, as they swing back and forth above the hook, causes a vibration and appearance which is very effective in attracting game fish to the lure and which imitates the movement of a darting fish. Moreover, it will be understood that the use of a vane having an inner cavity and pellets therein will further enhance the attraction to the lure by game fish.

In view of the above, it will be seen that the several objects of the invention are achieved and other advantageous results attained.

As various changes could be made in the above construction without departing from the scope of the invention, it is intended that all matter contained in the above description or shown in the accompanying drawings shall be interpreted as illustrated and not in a limiting sense.

What is claimed is:

1. A fishing lure comprising first and second diverging arms, means adjacent the juncture of said arms for attaching the lure to a fishing line, a hook connected to the first arm, a vane connected to the second arm to permit oscillating movement of the vane relative to the second arm, a spinner and means swivelly connecting said spinner directly to said vane, said vane being generally pear-shaped, having a relatively broad front portion connected to said second arm, and a narrower rear portion, said spinner being generally pear shaped having a relatively broad rear portion and narrower front portion swivelly connected at said narrower front portion to the narrower rear portion of said vane.

2. A fishing lure as set forth in claim 1 wherein said vane has an inner cavity and a plurality of pellets in the cavity.

3. A fishing lure as set forth in claim 1 wherein the first and second diverging arms are disposed in generally coplanar relationship.

4. A fishing lure as set forth in claim 1 wherein said vane is hollow, having opposed convex side walls forming an inner cavity.

5. A fishing lure as set forth in claim 4 wherein said vane has a plurality of pellets in the cavity.

6. A fishing lure as set forth in claim 5 wherein the first and second diverging arms are disposed in generally coplanar relationship.

7. A fishing lure as set forth in claim 1 wherein said attaching means comprises an eye with a rearward peripheral opening.

8. A fishing lure as set forth in claim 1 wherein said hook has a weighted body around its shank.

* * * * *